US012803732B2

(12) United States Patent
Wu et al.

(10) Patent No.: US 12,803,732 B2
(45) Date of Patent: Nov. 17, 2026

(54) SIGNAL TRANSMISSION METHOD AND APPARATUS AND TERMINAL

(71) Applicant: VIVO MOBILE COMMUNICATION CO., LTD., Dongguan (CN)

(72) Inventors: Kai Wu, Dongguan (CN); Lihui Wang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 382 days.

(21) Appl. No.: 18/377,045

(22) Filed: Oct. 5, 2023

(65) Prior Publication Data

US 2024/0089049 A1 Mar. 14, 2024

Related U.S. Application Data

(63) Continuation of application No. PCT/CN2022/085775, filed on Apr. 8, 2022.

(30) Foreign Application Priority Data

Apr. 9, 2021 (CN) ........................ 202110387320.7

(51) Int. Cl.
*H04L 5/00* (2006.01)

(52) U.S. Cl.
CPC .......... *H04L 5/0048* (2013.01); *H04L 5/0042* (2013.01); *H04L 5/0092* (2013.01)

(58) Field of Classification Search
CPC .................................................... H04L 5/0048
See application file for complete search history.

(56) References Cited

U.S. PATENT DOCUMENTS

| | | | | |
|---|---|---|---|---|
| 10,623,151 | B2 | 4/2020 | Kim et al. | |
| 10,720,972 | B2 | 7/2020 | Park et al. | |
| 11,297,577 | B2 | 4/2022 | Zhang | |
| 11,570,800 | B2 | 1/2023 | Tang | |
| 12,652,088 | B2 * | 6/2026 | Liu | H04B 7/0608 |
| 2016/0330680 | A1 * | 11/2016 | Yi | H04W 36/00692 |
| 2019/0363911 | A1 * | 11/2019 | Choi | H04L 5/0051 |
| 2020/0008091 | A1 | 1/2020 | Wu et al. | |
| 2020/0022120 | A1 | 1/2020 | Liu | |
| 2020/0177353 | A1 | 6/2020 | Ding et al. | |

(Continued)

FOREIGN PATENT DOCUMENTS

| | | | |
|---|---|---|---|
| CN | 108933648 | A | 12/2018 |
| CN | 109150450 | A | 1/2019 |

(Continued)

OTHER PUBLICATIONS

Hou, Jia et al., "Research on DSS uplink physical layer configuration", Application of Electronic Technique, 2020, pp. 23-28, vol. 46, No. 9 with Abstract.

(Continued)

*Primary Examiner* — Jason E Mattis
(74) *Attorney, Agent, or Firm* — The Webb Law Firm

(57) ABSTRACT

A signal transmission method includes determining, by a terminal, that a first subband is an available resource or an unavailable resource according to a resource type of the first subband; and performing, by the terminal, transmission of a first signal on the basis of the first subband in a case that the first subband is an available resource, where the first signal includes an SRS and/or a CSI-RS.

19 Claims, 6 Drawing Sheets

(56) References Cited

U.S. PATENT DOCUMENTS

| | | | | |
|---|---|---|---|---|
| 2021/0021314 | A1 | 1/2021 | Sun et al. | |
| 2021/0022006 | A1 | 1/2021 | Sun et al. | |
| 2021/0050976 | A1 * | 2/2021 | Noh | H04L 5/0048 |
| 2022/0022183 | A1 * | 1/2022 | Abdelghaffar | H04L 5/0044 |
| 2022/0078717 | A1 * | 3/2022 | Raghavan | H04W 52/242 |
| 2022/0231808 | A1 * | 7/2022 | Oh | H04L 5/0048 |

FOREIGN PATENT DOCUMENTS

| | | | |
|---|---|---|---|
| CN | 109495232 | A | 3/2019 |
| CN | 110248402 | A | 9/2019 |
| CN | 111955040 | A | 11/2020 |
| EP | 2579490 | A2 | 4/2013 |
| EP | 3681233 | A1 | 7/2020 |
| EP | 4171145 | A1 | 4/2023 |
| WO | 2018095227 | A1 | 5/2018 |
| WO | 2020167650 | A1 | 8/2020 |
| WO | 2021033119 | A1 | 2/2021 |
| WO | 2022014833 | A1 | 1/2022 |
| WO | 2022060627 | A1 | 3/2022 |

OTHER PUBLICATIONS

Zhao, Qi et al., "Study on single carrier FDMA modulation based on LTE", Electronic Design Engineering, Feb. 2011, pp. 47-50, vol. 19, No. 4 with Abstract.

* cited by examiner

500

S510

Determine that the first subband is an available resource or an unavailable resource according to a resource type of the first subband

↓

S520

Perform transmission of a first signal based on the first subband in a case that the first subband is an available resource

↓

S530

Perform a predetermined operation in a case that the CSI-RS is received in a first time unit but some frequency domain resources in the time domain resources in the first time unit are unavailable resources

FIG. 5A

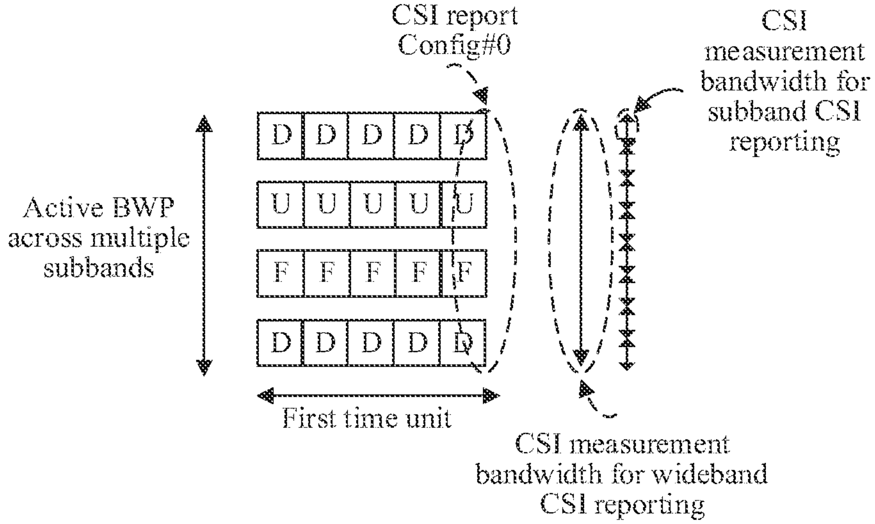

FIG. 5B

SIGNAL TRANSMISSION METHOD AND APPARATUS AND TERMINAL

CROSS-REFERENCE TO RELATED APPLICATIONS

This application is a Bypass Continuation Application of International Patent Application No. PCT/CN2022/085775, filed Apr. 8, 2022, and claims priority to Chinese Patent Application No. 202110387320.7, filed Apr. 9, 2021, the disclosures of which are hereby incorporated by reference in their entireties.

BACKGROUND OF THE INVENTION

Field of the Invention

The present disclosure belongs to the technical field of wireless communication, and relates to a signal transmission method and apparatus and a terminal.

Description of Related Art

For a full-duplex or flexible duplex network, in the related art, transmission of signals such as sounding reference signals (SRS) or channel state information-reference signals (CSI-RS) can only be performed on some frequency domain resources (such as subbands), resulting in low signal transmission efficiency.

SUMMARY OF THE INVENTION

Embodiments of the present disclosure provide a signal transmission method and apparatus, and a terminal.

According to a first aspect, provided is a signal transmission method, implemented by a terminal, the method including: determining that a first subband is an available resource or an unavailable resource according to a resource type of the first subband; and when the first subband is an available resource, performing, by the terminal, transmission of a first signal on the basis of the first subband, in a case that the first subband is an available resource, where the first signal includes an SRS and/or a CSI-RS.

According to a second aspect, provided is a signal transmission apparatus, including: a determining module, configured to determine that a first subband is an available resource or an unavailable resource according to a resource type of the first subband; and a transmitting module, configured to perform transmission of a first signal on the basis of the first subband in a case that the first subband is an available resource, where the first signal includes an SRS and/or a CSI-RS.

According to a third aspect, provided is a terminal, including a processor, a memory, and a program or an instruction that is stored in the memory and can run on the processor, the program or the instruction, when executed by the processor, implementing steps of the method according to the first aspect.

According to a fourth aspect, provided is a terminal, including a processor and a communication interface, where the communication interface is coupled to the processor, and the processor is configured to run a program or an instruction to implement steps of the method according to the first aspect.

According to a fifth aspect, provided is a non-transitory readable storage medium, storing a program or an instruction, the program or the instruction, when executed by the processor, implementing steps of the method according to the first aspect.

According to a sixth aspect, provided is a chip, including a processor and a communication interface, where the communication interface is coupled to the processor, and the processor is configured to run a program or an instruction to implement steps of the method according to the first aspect.

According to a seventh aspect, provided is a computer program/program product, stored in a non-transient storage medium, where the program/program product is executed by at least one processor to implement steps of the method according to the first aspect.

BRIEF DESCRIPTION OF THE DRAWINGS

FIG. 5A is a flowchart of a signal transmission method according to yet another exemplary embodiment of the present disclosure.

FIG. 5B and FIG. 5C respectively show schematic structural diagrams of subbands according to an embodiment of the present disclosure.

DESCRIPTION OF THE INVENTION

The technical solutions in embodiments of the present disclosure are clearly described in the following with reference to the accompanying drawings in the embodiments of the present disclosure. Apparently, the described embodiments are merely some, not all of the embodiments of the present disclosure. All other embodiments obtained by a person of ordinary skill in the art based on the embodiments in the present disclosure shall fall within the scope of the present disclosure.

In the specification and claims of the present disclosure, terms "first", "second", etc., are used to distinguish similar objects, but are unnecessarily used to describe a specific sequence or precedence order. It is to be understood that the terms used in this way are exchangeable in a proper case, so that the embodiments of the present disclosure described herein can be implemented in orders other than those illustrated or described herein. The objects distinguished by "first" and "second" are usually of one type, and the number of objects is not limited. For example, there may be one or more first objects. In addition, "and/or" used in this specification and the claims represents at least one of the connected objects, and the character "I" generally means that the related objects are in an "or" relationship.

The technologies described in the embodiments of the present disclosure are not limited to the Long Term Evolution (LTE)/LTE-advanced (LTE-A) system, and may further be applied to other wireless communication systems such as Code Division Multiple Access (CDMA), Time Division Multiple Access (TDMA), Frequency Division Multiple Access (FDMA), Orthogonal Frequency Division Multiple Access (OFDMA), Single-Carrier Frequency Division Multiple Access (SC-FDMA), and other systems. The terms "system" and "network" used in these embodiments of the present disclosure are usually used in an exchangeable manner. The technology described in the present disclosure can be applied to the systems and radio technologies mentioned above, and can also be applied to other systems and radio technologies. The following description describes the New Radio (NR) system for example purposes, and the NR terminology is used in most of the following descriptions, but these techniques can also be applied to applications other than NR system applications, such as the 6th generation (6G) Communication Systems.

Figure 1:
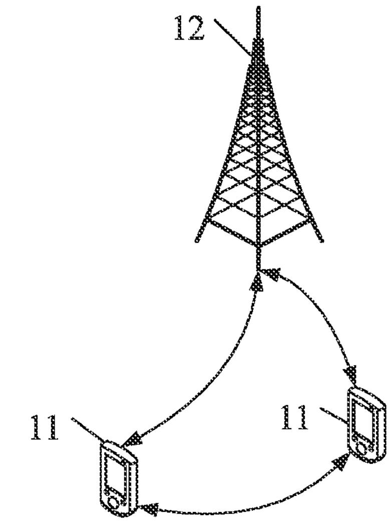
FIG. 1 is a schematic structural diagram of a wireless communication system according to an exemplary embodiment of the present disclosure.

FIG. 1 shows a schematic diagram of results of a wireless communication system to which the embodiment of the present disclosure is applicable. The wireless communication system includes a terminal 11 and a network side device 12. The terminal 11 may also be called a terminal device or a user equipment (UE). The terminal 11 may be other terminal-side devices, such as a mobile phone, a tablet personal computer, a laptop computer (also known as a notebook computer), a personal digital assistant (PDA), a palmtop computer, a netbook, an ultra-mobile personal computer (UMPC), a mobile Internet device (MID), a wearable device or a vehicle-mounted user equipment, or a pedestrian user equipment (PUE). The wearable device include: a smart watch, a wristband, a headphone, glasses, etc. The specific type of the terminal 11 is not limited in the embodiments of the present disclosure. The network-side device 12 may be a base station or a core network side device. The base station may be called a Node B, an evolved Node B, an access point, a base transceiver station (BTS), a radio base station, a radio transceiver, a basic service set (BSS), an extended service set (ESS), a node B, an evolved node B (eNB), a home node B, a home evolved node B, a WLAN access point, a WiFi node, a transmitting receiving point (TRP) or some other suitable terms in the field, as long as the same technical effect is achieved. The base station is not limited to specific technical words. Only a base station in an NR system is used as an example in the embodiments of the present disclosure, but a specific type of the base station is not limited.

For the CSI-RS, since the network may configure or indicate flexible or uplink transmission directions on some subbands, the network cannot perform transmission of the CSI-RS on some subbands.

For the SRS, since the network may configure or indicate flexible or downlink transmission directions on some subbands, the terminal cannot perform transmission of the CSI-RS on some subbands.

The technical solution of the embodiments of the present disclosure is described below through some embodiments and their application scenarios with reference to the accompanying drawings.

Figure 2:
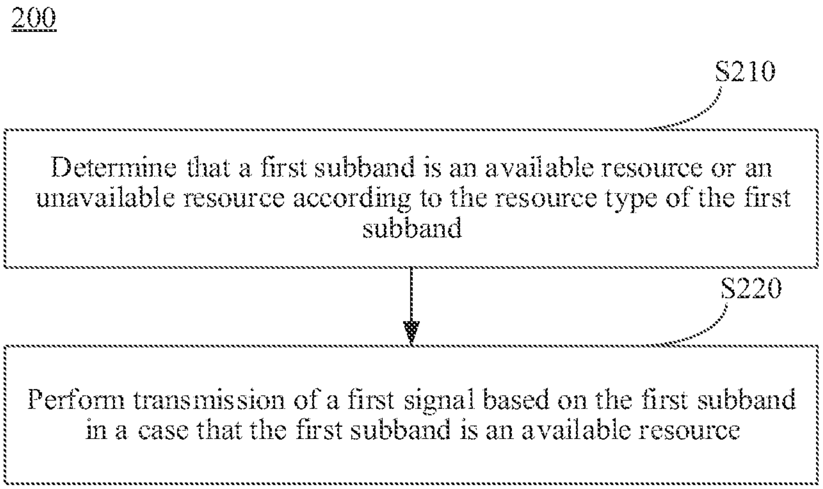
FIG. 2 is a flowchart of a signal transmission method according to an exemplary embodiment of the present disclosure.

As shown in FIG. 2, it is a schematic flowchart of a signal transmission method 200 according to an exemplary embodiment of the present disclosure. The method 200 may be but not limited to being executed by a terminal, but may be executed by hardware/and/or software installed in the terminal. In this embodiment, the method 200 may at least include the following steps.

S210. Determine that a first subband is an available resource or an unavailable resource according to a resource type of the first subband.

The resource type of the first subband includes uplink (Up, U), downlink (Down, D) or flexible (Flexible, F). The network side indicates the direction of frequency domain resources according to a certain frequency domain width, which may be referred to as a subband, a resource block set (RB set) or a resource element set (RE set) in the embodiments of the present disclosure. That is to say, a subband may also be understood as an RB set or RE set in the present disclosure.

In an implementation, the resource type of the first subband may be indicated through first indication information. The first indication information includes at least one of high-layer signaling (such as RRC, etc.), medium access control-control element (MAC CE), downlink control information (DCI). In this embodiment, the resource types of the first subbands located in different time units (such as time slots, sub-slots, symbols, frames, etc.) may be different or the same, which will not be limited here.

In another implementation, the transmission time of the first indication information is earlier than the transmission time of the first signal, and there is a first time difference between the transmission time of the first indication information and the transmission time of the first signal. In other words, taking the first signal as an SRS as an example, the network side may perform transmission of the first indication information at time T before the transmission time of the SRS to indicate the resource type of the first subband, so that the terminal can determine, based on the resource type of the first subband, whether the first subband is an available resource or an unavailable resource.

In addition, it is to be understood that the available resource refers to the resource that can be used for the transmission of the first signal, and correspondingly, the unavailable resource refers to the resource that cannot be used for the transmission of the first signal.

S220. Perform transmission of a first signal on the basis of the first subband in a case that the first subband is an available resource.

The first signal includes but is not limited to SRS and/or CSI-RS and the like. Correspondingly, according to different first signals, the terminal may perform signal reception and transmission on the basis of the first subband.

In this embodiment, the terminal determines whether to perform signal transmission on a subband according to the resource type (such as resource direction) of the subband configured or indicated by a network. In this way, it can solve the problem of low signal transmission efficiency caused by transmission of signals such as SRS and/or CSI-RS that is only performed on some frequency resources in a full-duplex network or a flexible duplex network, thereby ensuring wireless communication performance.

Figure 3A:
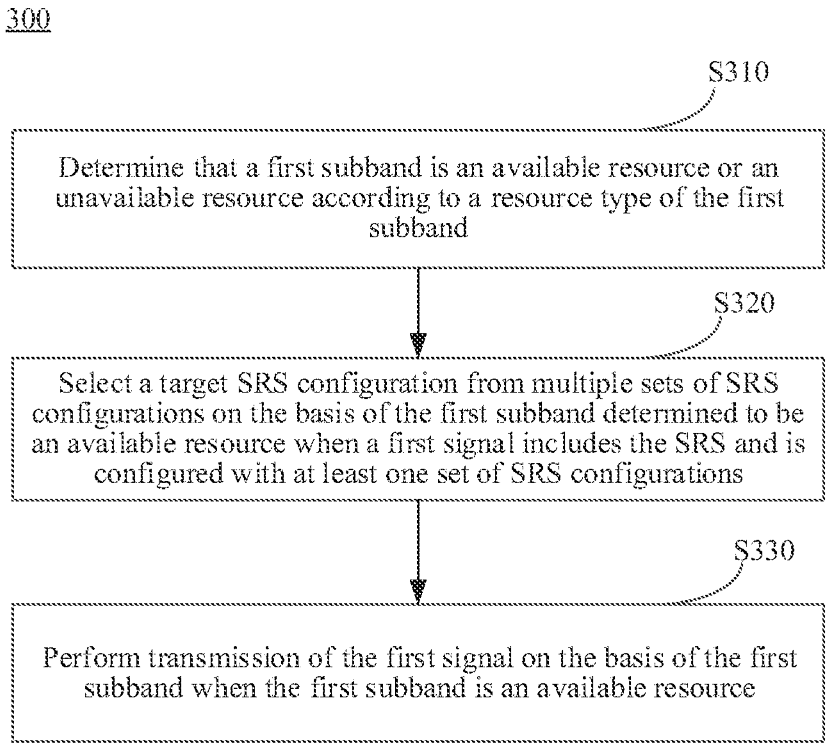
FIG. 3A is a flowchart of a signal transmission method according to another exemplary embodiment of the present disclosure.

As shown in FIG. 3A, it is a schematic flowchart of a signal transmission method 300 according to an exemplary embodiment of the present disclosure. The method 300 may be but not limited to being executed by a terminal, but may be executed by hardware/and/or software installed in the terminal. In this embodiment, the method 300 may at least include the following steps.

S310. Determine that a first subband is an available resource or an unavailable resource according to a resource type of the first subband.

It is to be understood that in addition to referring to the relevant description in the method embodiment 200 for the implementation process of S310, as a possible implementation, the implementation process of "determining that a first subband is an available resource or an unavailable resource according to a resource type of the first subband" in S310 may include but be not limited to at least one of the following methods 1 and 2.

Method 1: In a case that the first signal includes an SRS and the resource type of the first subband is uplink and/or flexible, it is determined that the first subband is an available resource.

For example, assuming that the first subband is an available resource and the resource type is uplink, the terminal may perform transmission of the SRS on the first subband of which the resource type is uplink. That is, the terminal does not perform transmission of the SRS on the first subband of which the resource type is downlink or flexible.

For another example, assuming that the first subband is an available resource and the resource type is flexible, the terminal may perform transmission of the SRS on the first subband of which the resource type is flexible. That is, the terminal does not perform transmission of the SRS on the first subband of which the resource type is downlink.

Method 2: In a case that the first signal includes a CSI-RS and the resource type of the first subband is downlink and/or flexible, it is determined that the first subband is an available resource.

For example, assuming that the first subband is an available resource and the resource type is downlink, the terminal may receive the CSI-RS on the first subband of which the resource type is downlink. That is, the terminal does not receive the CSI-RS on the first subband of which the resource type is uplink or flexible.

For another example, assuming that the first subband is an available resource and the resource type is flexible, the terminal may receive the CSI-RS on the first subband of which the resource type is flexible. That is, the terminal does not receive the CSI-RS on the first subband of which the resource type is uplink.

S320. Select a target SRS configuration from at least one set of SRS configurations on the basis of the first subband determined to be an available resource in a case that the first signal includes the SRS and is configured with at least one set of SRS configurations.

At least one set of SRS configurations may be configured by the network side, so that the terminal may determine the target SRS configuration used for transmission of the SRS based on the subband determined to be an available resource. In this embodiment, the target SRS configuration meets at least one of the following (1)-(3).

(1) The SRS resources in the target SRS configuration are all located in the first subband determined to be an available resource.

(2) In the at least one set of SRS configurations, the target SRS configuration has the largest number of resources occupied by the SRS resources.

The number of resources here can be any one of the number of subbands, the number of RBs, and the number of REs. In this embodiment, the largest number of resources included in the SRS configuration may also be understood as the largest bandwidth occupied by the SRS resources in the SRS configuration.

Assuming that the subband used to determine the number of resources occupied by the SRS resources in each set of SRS configurations is a third subband. Then, the third subband may include a plurality of consecutive subbands, and the plurality of consecutive subbands do not include subbands determined to be unavailable resources. In other words, during the selection of the target SRS configuration, only consecutive subbands are considered, and subbands determined to be unavailable resources are not included in the consecutive subbands.

(3) The target SRS configuration is an SRS configuration with a second specified index value in at least one set of the SRS configurations.

The second specified index value includes a maximum index value or a minimum index value among the indexes respectively included in each of the SRS configurations. In this embodiment, the second specified index value may be specified by a protocol or configured by a high-level signaling, which will not be limited here.

S330. Perform transmission of the first signal on the basis of the first subband in a case that the first subband is an available resource.

The first signal here includes an SRS and/or a CSI-RS.

It is to be understood that in addition to referring to the relevant description in the method embodiment 200 for the implementation process of S330, as a possible implementation, the implementation process of "performing transmission of the first signal on the basis of first subband" in S330 may include: performing transmission of the first signal based on second subbands in a case that a plurality of first subbands are determined to be available resources.

The second subbands here meet at least one of the following (1)-(2).

(1) The second subbands are consecutive subbands in the plurality of first subbands. In this case, the terminal performs transmission of the SRS on the consecutive subbands. Subbands determined to be unavailable resources are not included in the plurality of consecutive subbands. In addition, the number of subbands included in the consecutive subbands which will not be limited here.

(2) The second subbands are subbands with a first specified index value among the plurality of first subbands. The first specified index value includes a maximum index value or a minimum index value among index values of the plurality of first subbands. In this case, the terminal performs transmission of the SRS on the subbands with the minimum index value. It can be understood that there may be one or more subbands with the first specified index value, which will not be limited here.

Figure 3B:
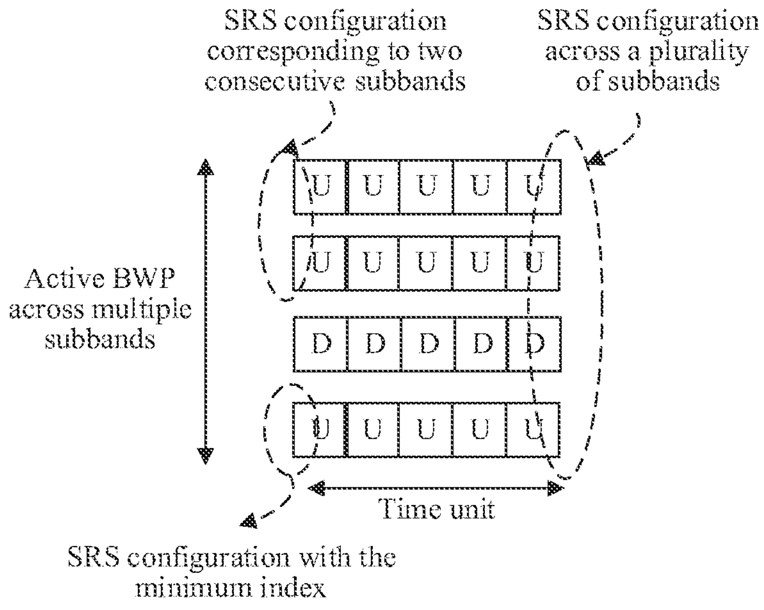
FIGS. 3B and 3C respectively show schematic structural diagrams of subbands according to an embodiment of the present disclosure.

Based on the description of the foregoing method embodiment 300, for ease of understanding, the signal transmission process given in this embodiment will be described below in conjunction with FIG. 3B and FIG. 3C, and the content is stated as follows.

Assuming that the network side configures multiple sets of SRS configurations for the terminal to perform transmission of the SRS, in this time unit (such as a symbol), some subbands are indicated as unavailable resources, and the unavailable resources may be because the network indicates that the resource types of the subbands are downlink or flexible (e.g., "D" in FIG. 3B and FIG. 3C), and the terminal does not perform transmission of the SRS on the subbands.

In this case, referring to FIG. 3B again, the terminal selects the target SRS configuration from configured multiple sets of SRS configurations to perform SRS transmission. For example, the target SRS configuration is an SRS configuration with the minimum index value (also can be understood as the lowest index value). For another example, the target SRS configuration is an SRS configuration corresponds to two consecutive subbands. It can be understood that since the SRS configuration across multiple subbands shown in FIG. 3B includes unavailable resources, it cannot be used as the target SRS configuration.

Alternatively, in another implementation, the network side pre-configures multiple sets of SRS configurations for SRS transmission, and the terminal determines the target SRS configuration for SRS transmission according to the configuration or indication of the resource type of the subband by the network.

Figure 3C:
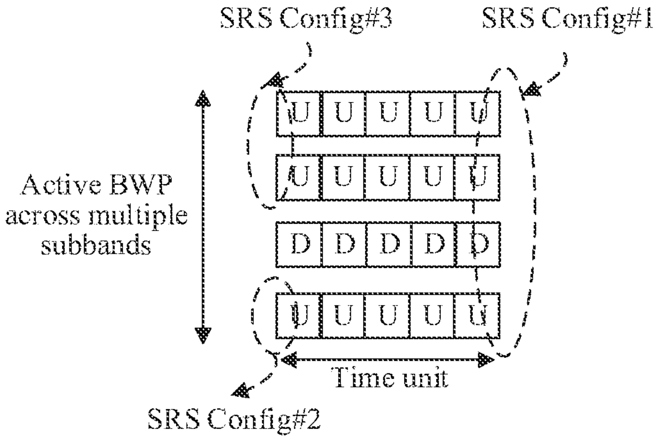

For example, referring to FIG. 3C, assuming that the network side configures three SRS configurations (config) for transmission on different frequency domain resources, but the time domain resources for transmission (e.g., the time unit shown in FIG. 3C) are the same, that is, the time domain resources are the same in terms of period and offset value. Assuming that there are subbands which are unavailable resources ("D" shown in FIG. 3C) in a case that SRS config #1 is used for transmission, the terminal can select other SRS config for SRS transmission. For example, the SRS config with the minimum index value is selected, for example, SRS config #2. The SRS config #2 refers to SRS config which does not include any unavailable resource. Alternatively, the terminal uses the SRS config with the most subbands for continuous transmission. For example, SRS config #3 can perform SRS transmission on two subbands, but SRS config #2 can only perform SRS transmission on one subband, then the terminal selects SRS config #3 for SRS transmission.

In this embodiment, in a case that some resources are unavailable, the terminal can determine available frequency domain resources to perform transmission of the SRS, thereby realizing effective transmission of the SRS.

Figure 4:
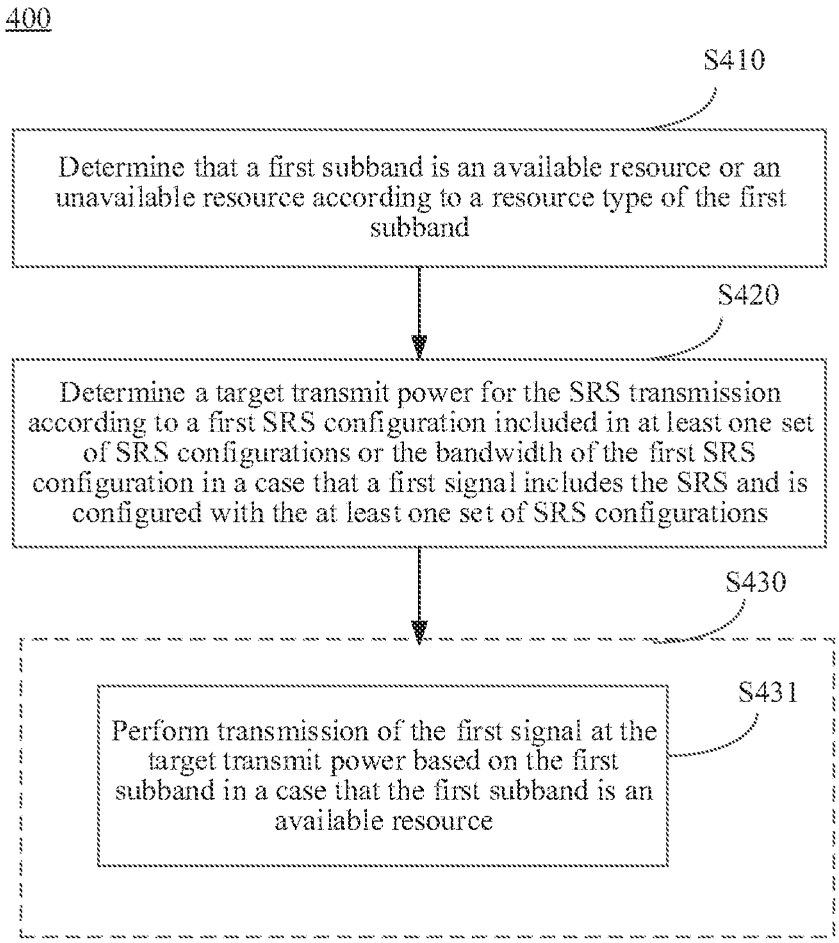
FIG. 4 is a flowchart of a signal transmission method according to yet another exemplary embodiment of the present disclosure.

As shown in FIG. 4, it is a schematic flowchart of a signal transmission method 400 according to an exemplary embodiment of the present disclosure. The method 400 may be but not limited to being executed by a terminal, but may be executed by hardware/and/or software installed in the terminal. In this embodiment, the method 400 may at least include the following steps.

S410. Determine that a first subband is an available resource or an unavailable resource according to a resource type of the first subband.

For the implementation process of S410, reference may be made to relevant descriptions in the foregoing method embodiments 200 and/or 300, and details are not repeated here to avoid repetition.

S420. Determine a target transmission power for the SRS transmission according to a first SRS configuration or the bandwidth of the first SRS configuration in a case that the first signal includes the SRS and is configured with at least one set of SRS configurations.

The first SRS configuration here belongs to the at least one set of SRS configurations. In this embodiment, the first SRS configuration can be understood that: the terminal can perform transmission of the SRS at the power corresponding to the first SRS configuration. Optionally, the first SRS configuration may include one of the following (1)-(3).

(1) A reference SRS configuration specified by the protocol or indicated by the network.

(2) An SRS configuration of which the bandwidth is a specified value, where the specified value may be specified by the protocol or indicated by the network side, which will not be limited here.

(3) An SRS configuration of which the index value is a third specified index value, where the third index value may be specified by the protocol or configured by the network side, which will not be limited here.

In an implementation, the implementation process of "determining a target transmission power according to the first SRS configuration or the bandwidth of the first SRS configuration" in S420 may include the following method 1 or method 2.

Method 1: In a case that the number of resources included in the first subband determined to be an available resource is less than the number of resources occupied by the SRS in the first SRS configuration, it is determined that a transmission power corresponding to the first SRS configuration is the target transmission power. The number of resources here is any one of the number of subbands, the number of RBs, and the number of REs.

For example, if the first SRS configuration or the bandwidth of the first SRS configuration occupies 4 subbands, and the transmission bandwidth of the actual transmission bandwidth only occupies 2 subbands, then the transmission power that the terminal can perform transmission of the SRS on two bands is the same as the total transmission power that the terminal can perform transmission of the SRS on four subbands according to the first SRS configuration. That is, the energy per resource element (EPRE) is twice the original.

In Method 1, since the frequency domain resource actually occupied when the terminal perform transmission of the SRS becomes smaller, the EPRE (Energy per resource element) of the SRS transmission performed by the terminal becomes larger than that of the first SRS configuration. That is, the terminal can use a larger EPRE to perform transmission of the SRS. In a case that the transmission of SRS of some subbands cannot be performed, the EPRE of the SRS transmission performed on the subbands determined to be available resources is increased, which can ensure that the network can obtain more accurate uplink measurement results, channel quality determination results, etc.

Method 2: In a case that the number of resources included in the first subband determined to be an available resource is less than the number of resources occupied by the SRS in the first SRS configuration, the total transmission power corresponding to the first SRS configuration is scaled according to a predetermined ratio to obtain the target transmission power. The predetermined ratio is determined according to the number of resources included in the first subband determined to be an available resource and the number of resources occupied by the SRS in the first SRS configuration. The number of resources here is any one of the number of subbands, the number of RBs, and the number of REs.

For example, if the number of resources included in the subband determined to be an available resource is less than the number of resources included in the first SRS configuration, or the bandwidth of the subband determined to be available resources is smaller than the bandwidth of the first SRS configuration, then the terminal scales the total transmission power corresponding to the first SRS configuration to ensure that the transmitted EPREs are the same.

In Method 2, since the frequency domain resource actually occupied when the terminal performs transmission of the SRS becomes smaller, the total transmission power of the terminal in this time unit becomes smaller. That is, the terminal keeps the EPRE of the SRS constant. Regardless of the bandwidth of the subbands for transmission by the terminal, when the network side receives the SRS, it does not need to convert the received power according to the bandwidth, and then perform measurement and channel quality determination.

S430. Performing transmission of a first signal on the basis of the first subband in a case that the first subband is an available resource.

The first signal includes an SRS and/or a CSI-RS.

It is to be understood that in addition to referring to the relevant description in the method embodiment 200 and/or 300 for the implementation process of S430, as a possible implementation, the implementation process of "performing transmission of the first signal on the basis of the first subband" in S430 may include S431 shown in FIG. 4. The content is stated as follows.

S431. Perform transmission of the first signal at the target transmission power on the basis of the first subband.

In this embodiment, the terminal controls the transmission power used to perform transmission of the SRS, thereby realizing efficient transmission of the SRS. Moreover, the network side can implement more accurate uplink measurement, channel quality determination, and the like according to different power control methods adopted by the terminal, thereby ensuring wireless communication performance.

Figure 5C:
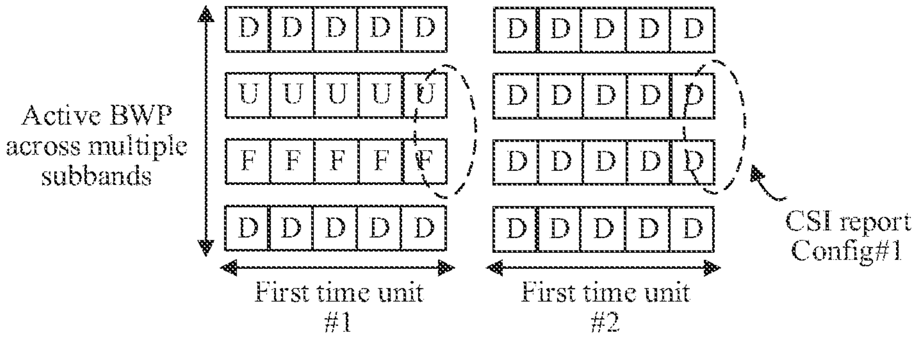

As shown in FIG. 5A, it is a schematic flowchart of a signal transmission method 500 according to an exemplary embodiment of the present disclosure. The method 500 may be but not limited to being executed by a terminal, but may be executed by hardware/and/or software installed in the terminal. In this embodiment, the method 500 may at least include the following steps.

S510. Determine that a first subband is an available resource or an unavailable resource according to a resource type of the first subband.

S520. Perform transmission of a first signal on the basis of the first subband in a case that the first subband is an available resource.

The first signal includes an SRS and/or a CSI-RS.

It can be understood that for the implementation process of S510 and S520, reference may be made to the related description of at least one of the foregoing method embodiments 200-400, and details are not repeated here to avoid repetition.

S530. Perform a predetermined operation in a case that the terminal receives the CSI-RS in a first time unit but some frequency domain resources in the time domain resources in the first time unit are unavailable resources.

The first time unit may be a time slot, a symbol, a subframe, and the like and the first time unit may be specified by a protocol or configured by a network, which will not be limited here.

The some frequency domain resources include at least one subband and/or a guard band between the subbands. It can be understood that, in the case of a full-duplex network or a flexible duplex network, in order to avoid interference between uplink and downlink, a guard band is introduced between uplink and downlink frequency domain resources to avoid interference between uplink and downlink. For example, for a guard band between paired spectrums, it serves as a guard interval between an uplink carrier and a downlink carrier. For another example, for unpaired spectrums, in the same time unit, different subbands have different transmission directions, and a guard interval also needs to be introduced in the subband, that is, a guard band between subbands in the carrier is introduced.

In a possible implementation, the unavailable resource includes at least one of the following (1)-(3).

(1) A subband of which the resource type is uplink or flexible;

(2) A guard band; and (3) A subband that includes a number of resources less than a predetermined value, where the number of resources is the number of RBs or the number of REs. The predetermined value may be specified by a protocol or configured by the network side. For example, if the number of resources included in a certain subband is less than the predetermined value, the subband is an unavailable resource.

In this case, if some frequency domain resources are unavailable in the first time unit used for CSI-RS reception, then the terminal may perform the predetermined operation. In this embodiment, the predetermined operation includes at least one of the following (1)-(4).

(1) Not reporting a CSI report corresponding to the CSI-RS. That is, in the case that some frequency domain resources are unavailable, the terminal does not report the CSI report.

(2) Reporting a first CSI report corresponding to a first CSI-RS, where the first CSI-RS is a CSI-RS received through a first subband that is in the first time unit and determined to be an available resource. That is, the terminal only reports a CSI report determined based on a CSI-RS received on a subband determined to be an available resource.

(3) Reporting a parameter value in the CSI report corresponding to the CSI-RS that goes out of a predetermined range (i.e., out-of-range, OOR). In this embodiment, the predetermined range may be but not limited to the range of the channel quality indicator (CQI). For example, OOR may be CQI=0.

(4) Reporting a second CSI report, where the second CSI report is a CSI report reported by the terminal previously. In other words, the terminal does not update the CSI report, and reports again the previously reported CSI report that is not updated.

The aforementioned CSI-RS includes at least one of wideband CSI-RS and subband CSI-RS. The subband CSI-RS may include the best X subbands and the worst Y subbands.

In addition, in the aforementioned reporting of the CSI report, if the CSI report corresponding to the wideband CSI-RS is reported, the CSI report may be reported through the first subband determined to be an available resource. For example, in a case that unavailable resources are not considered, assuming that there are four subbands, the CSI report is determined based on the four subbands; on the contrary, in a case that unavailable resources are considered, assuming that at least three subbands among the four subbands are available resources, then the CSI report may be determined based on the subbands determined to be available resources. The process of determining the CSI report will not be repeated here.

In the aforementioned implementations, the subbands used for reporting the CSI report may be the same as or different from the subbands divided based on network frequency domain resources, which will not be limited here.

For ease of understanding, the signal transmission process given in this embodiment is described below by taking the reception of CSI-RS and the reporting of CSI report as examples, and the content is stated as follows.

The terminal performs reception of the CSI-RS or transmission of the corresponding CSI report based on the subband determined to be the available resource (i.e., the aforementioned first subband). Optionally, as shown in FIG.

5B, since some frequency domain resources are configured (or indicated) by the network side as uplink ("U" in FIG. 5B) or flexible ("F" in FIG. 5B) Therefore, the network side configures a broadband configuration for the CSI-RS resources, such as the BWP across multiple subbands (RB set) shown in FIG. 5B. In this case, the terminal only receives the CSI-RS transmitted on the subband that is determined to be an available resource among the multiple subbands, and reports the CSI report based on the subband that receives the CSI-RS.

Assuming that the terminal receives CSI-RS in the first time unit, if all subbands on the first time unit are available, for example, the resource types are all downlink or flexible (e.g., the first time unit #2 shown in FIG. 5C), the terminal can measure and report the wideband CSI based on the CSI-RS resources on all subbands. When the terminal measures and reports the CSI, RE resources corresponding to the CSI-RS in the guard band are excluded.

If at least one subband in the frequency domain resources corresponding to the first time unit is an unavailable resource (e.g., the first time unit #1 shown in FIG. 5C), the terminal does not report the CSI, or the terminal reports OOR, or the terminal performs CSI measurement and reporting based on the CSI-RS received in the subband determined to be an available resource.

In a case that the network side also configures the terminal to report subband CSI, if at least one RE in the frequency domain resources corresponding to the subband CSI is an unavailable resource or is located in the guard band, the terminal does not report CSI on the subband. That is, only CSI reports corresponding to available CSI-RS resources are reported. For example, in CSI subbands 1, 2, and x, if subband x is not available, then CSI reports of widebands and other subbands than the subband x are reported. Alternatively, the terminal still reports CSI, but the corresponding subband CSI includes OOR.

For the reporting of subband CSI, due to the fact that the division of subbands for CSI reporting is different from the width of the granular RB set configured or indicated by the network side in the frequency domain resource direction, all or part of the CSI-RS resources corresponding to the CSI reporting of some subbands may be valid CSI-RS, that is, in a downlink or flexible subband, the other part is unavailable CSI-RS resources, that is, in an unavailable RB set or in a guard band, then the terminal considers the CSI-RS resources of the subband are not available measurement resources for subband CSI reporting.

If the ratio of the number of REs and RBs of the available CSI-RS exceeds a predetermined value, it is considered as an available measurement resource for subband CSI reporting.

OOR corresponds to CQI=0 in the reported values of CSI; for other reported values, such as rank indicator (RI), precoding matrix indicator (PMI), CSI-RS resource indicator (CRI), L1 reference signal received power (Layer 1 reference signal received power, L1-RSRP), L1 signal-to-noise and interference ratio (Layer 1 signal-to-noise and interference ratio, L1-SINR), predetermined values can also be defined, and when the CSI-RS resources are unavailable, the corresponding reported values in the corresponding CSI report adopt the predetermined values.

Since the network side may indicate that some subbands are unavailable resources through dynamic signaling (for example, through PDCCH), that is, the transmission of CSI-RS on the corresponding frequency domain resources is canceled, and some of the CSI measurement values corresponding to the CSI-RS cannot be obtained. Because a CSI report includes multiple subband CSI reports, or a PUCCH/PUSCH includes a plurality of CSI reports.

If the terminal does not report the corresponding (subband) CSI report and the network side does not know whether the terminal receives the dynamic signaling, in a case that the terminal receives the signaling or does not receive the signaling, the number of bits of CSI transmitted by the terminal is different, and the network side cannot know the actual number of bits transmitted by the terminal. In this case, by still performing transmission of reports corresponding to these invalid CSI-RS resources while performing transmission of the OOR or other preset information, the complexity of receiving CSI reports at the network side can be simplified.

Alternatively, the terminal only performs transmission of the CSI report corresponding to the valid CSI-RS resources and explicitly (the CSI report carries extra signaling bits) or implicitly (the time domain/frequency domain/DMRS resources used to perform transmission of the CSI report are different) informs the base station which valid CSI-RS resources the transmitted CSI report corresponds to, thereby reducing the overhead of uplink transmission and improving the performance of CSI reception.

In this embodiment, the terminal determines the CSI-RS receiving process and the reporting manner of the CSI report in a case that some resources are unavailable, so as to ensure effective transmission of the CSI-RS and the CSI report.

It should be noted that, the signal transmission method provided in the embodiment of the present disclosure may be executed by a signal transmission apparatus, or a control module in the signal transmission device for executing the signal transmission method. In the embodiment of the present disclosure, the signal transmission apparatus provided in the embodiment of the present disclosure is described by taking the signal transmission apparatus executing the signal transmission method as an example.

Figure 6:
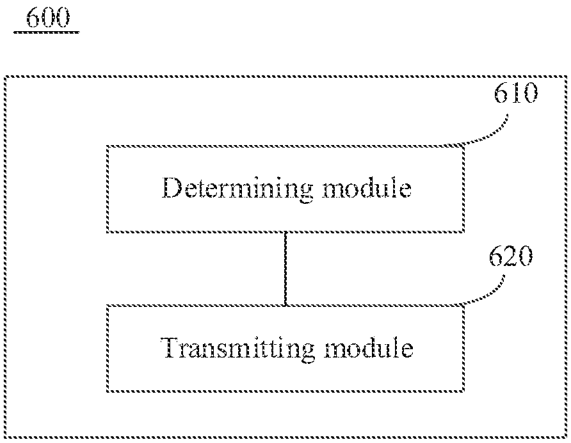
FIG. 6 is a schematic block structural diagram of a signal transmission apparatus according to an exemplary embodiment of the present disclosure.

As shown in FIG. 6, it is a schematic block structural diagram of a signal transmission apparatus 600 according to an exemplary embodiment of the present disclosure. The apparatus 600 includes: a determining module 610, configured to determine that a first subband is an available resource or an unavailable resource according to a resource type of the first subband; and a transmitting module 620, configured to perform transmission of a first signal on the basis of the first subband in a case that the first subband is an available resource, where the first signal includes an SRS and/or a CSI-RS.

Optionally, the determining module 610 is configured to: determine that the first subband is an available resource in a case that the first signal includes an SRS and the resource type of the first subband is uplink and/or flexible; and/or determine that the first subband is an available resource in a case that the first signal includes a CSI-RS and the resource type of the first subband is downlink and/or flexible.

Optionally, the transmitting module 620 is configured to perform transmission of the first signal based on second subbands in a case that a plurality of first subbands are determined to be available resources, where the second subbands meet at least one of the following: consecutive subbands in the plurality of first subbands; and subbands with a first specified index value among the plurality of first subbands.

Optionally, the first specified index value includes a maximum index value or a minimum index value among index values of the plurality of first subbands.

Optionally, the resource type of the first subband is indicated through first indication information. The first indication information includes at least one of high-layer signaling, MAC CE, and DCI.

Optionally, the transmission time of the first indication information is earlier than the transmission time of the first signal, and there is a first time difference between the transmission time of the first indication information and the transmission time of the first signal.

Optionally, the determining module 610 is further configured to select a target SRS configuration from at least one set of SRS configurations on the basis of the first subband determined to be an available resource in a case that the first signal includes the SRS and is configured with the at least one set of SRS configurations.

Optionally, the target SRS configuration meets at least one of the following: the SRS resources in the target SRS configuration are all located in the first subband determined to be an available resource; in the at least one set of SRS configurations, the target SRS configuration has the largest number of resources occupied by the SRS resources; and the target SRS configuration is an SRS configuration with a second specified index value in the at least one set of the SRS configurations.

Optionally, the third subband includes a plurality of consecutive subbands, and the plurality of consecutive subbands do not include subbands determined to be unavailable resources, where the third subband is configured to determine the number of resources occupied by the SRS resources in each set of SRS configurations.

Optionally, the determining module 610 is further configured to determine a target transmission power for the SRS transmission according to a first SRS configuration or the bandwidth of the first SRS configuration in a case that the first signal includes the SRS and is configured with at least one set of SRS configurations, where the first SRS configuration belongs to the at least one set of SRS configurations. The transmitting module is configured to perform transmission of the first signal at the target transmission power on the basis of the first subband.

Optionally, the determining module 610 is configured to: determine that a transmission power corresponding to the first SRS configuration is the target transmission power in a case that the number of resources included in the first subband determined to be an available resource is less than the number of resources occupied by the SRS in the first SRS configuration; or scale the total transmission power corresponding to the first SRS configuration according to a predetermined ratio to obtain the target transmission power in a case that the number of resources included in the first subband determined to be an available resource is less than the number of resources occupied by the SRS in the first SRS configuration, where the predetermined ratio is determined according to the number of resources included in the first subband determined to be an available resource and the number of resources occupied by the SRS in the first SRS configuration.

Optionally, the first SRS configuration includes one of the following: a reference SRS configuration specified by the protocol or indicated by a network; an SRS configuration of which the bandwidth is a specified value; and an SRS configuration of which the index value is a third specified index value, Optionally, the number of resources is any one of the number of subbands, the number of RBs, and the number of REs.

Optionally, the transmitting module 620 is further configured to perform at least one of the following in a case that the CSI-RS is received in a first time unit but some frequency domain resources in the time domain resources in the first time unit are unavailable resources: not reporting a CSI report corresponding to the CSI-RS; reporting a first CSI report determined based on a first CSI-RS, where the first CSI-RS is a CSI-RS received through the first subband that is in the first time unit and determined to be an available resource; reporting a parameter value in the CSI report corresponding to the CSI-RS that goes out of a predetermined range; and reporting a second CSI report, where the second CSI report is a CSI report reported by the terminal previously.

Optionally, the some frequency domain resources include at least one subband and/or a guard band between the subbands.

Optionally, in a case that the CSI report corresponding to the wideband CSI-RS is reported, the CSI report is reported through the first subband determined to be an available resource.

Optionally, the unavailable resource includes at least one of the following: a subband of which the resource type is uplink or flexible; a guard band; and a subband that includes a number of resources less than a predetermined value, where the number of resources is the number of RB s or the number of REs.

Optionally, resource types of the first subbands located in different time units are different.

The signal transmission apparatus in the embodiment of the present disclosure may be a device, a device with an operating system or an electronic device, and may also be a component, an integrated circuit, or a chip in a terminal. The apparatus or electronic device may be a mobile terminal or may be a non-mobile terminal. As an example, the mobile terminal may include but is not limited to the types of terminals 11 listed above, and the non-mobile terminal may be a server, a network attached storage (NAS), a personal computer (PC), a television (TV), a teller machine or a self-service machine, etc., which is not specifically limited in this embodiment of the present disclosure.

The signal transmission apparatus provided by the embodiment of the present disclosure can implement various processes realized by the method embodiments in FIG. 2 to FIG. 5A, and achieve the same technical effect. To avoid repetition, details are not repeated here.

Figure 7:
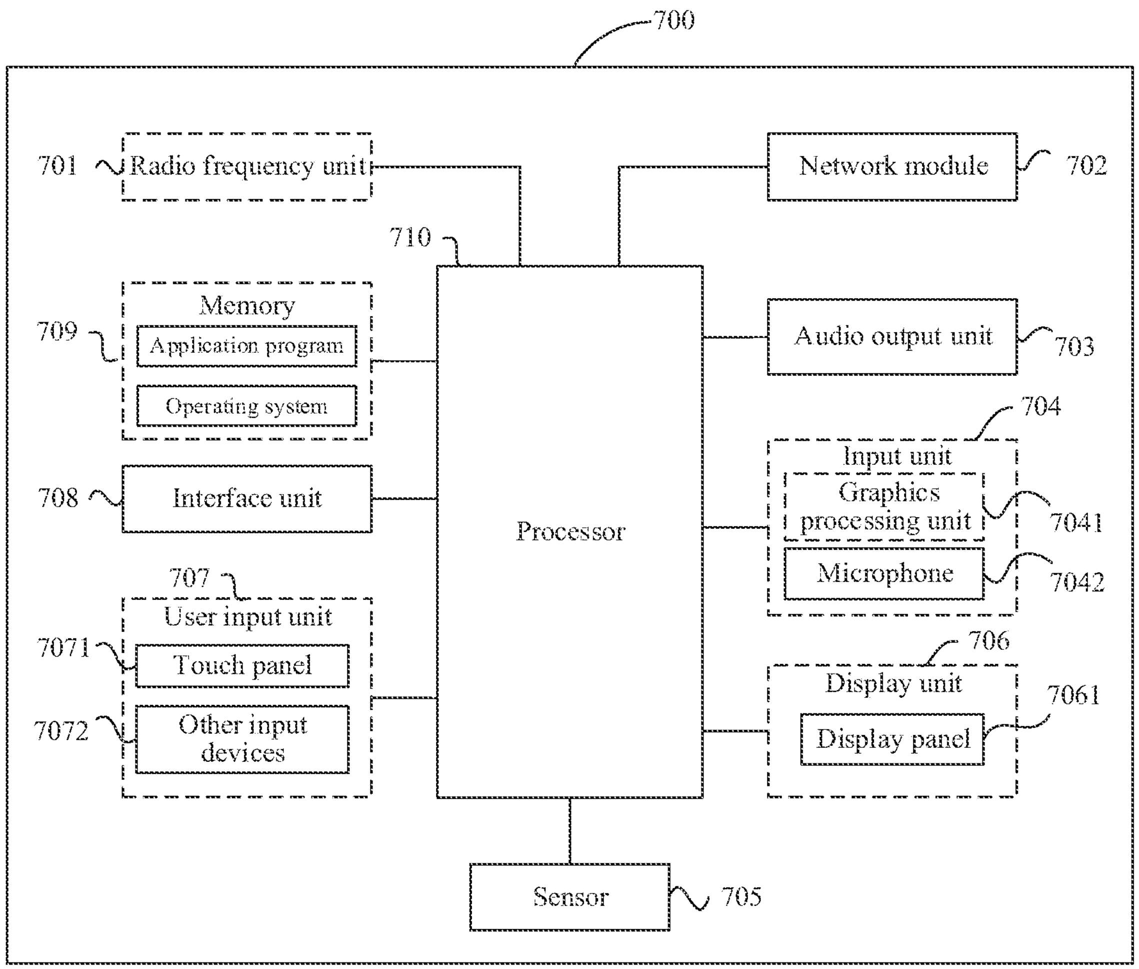
FIG. 7 is a schematic block structural diagram of a terminal according to an exemplary embodiment of the present disclosure.

The embodiment of the present disclosure also provides a terminal, including a processor and a communication interface. The communication interface is coupled to the processor, and the processor is configured to run a program or an instruction to implement the methods described in the foregoing method embodiments 200-500. This terminal embodiment corresponds to the above-mentioned terminal-side method embodiment, and various implementation processes and implementations of the above-mentioned method embodiment can be applied to this terminal embodiment and can achieve the same technical effect. Optionally, FIG. 7 is a schematic structural diagram of hardware in a terminal according to the embodiment of the present disclosure.

The terminal 700 includes, but is not limited to: at least some of a radio frequency unit 701, a network module 702, an audio output unit 703, an input unit 704, a sensor 705, a display unit 706, a user input unit 707, an interface unit 708, a memory 709, a processor 710, and other components.

Those skilled in the art can understand that the terminal 700 may further include a power supply (e.g., a battery) for supplying power to various components. The power supply may be logically connected to the processor 710 through a power management system, so that the power management system can function to manage charging, discharging, power consumption and the like. The terminal structure shown in FIG. 7 does not constitute a limitation on the terminal. The terminal may include more or less components than those shown in the figure, or combine some components or different component arrangements, which will not be repeated here.

It is to be understood that, in the embodiment of the present disclosure, the input unit 704 may include a graphics processing unit (GPU) 7041 and a microphone 7042. The GPU 7041 processes image data of static pictures or videos obtained by an image capture apparatus (such as a camera) in a video capture mode or an image capture mode. The display unit 706 may include a display panel 7061, and the display panel 7061 may be configured in the form of a liquid crystal display, an organic light emitting diode, or the like. The user input unit 707 includes a touch panel 7071 and other input devices 7072. The touch panel 7071 is also called a touch screen. The touch panel 7071 may include two parts: a touch detection apparatus and a touch controller. Other input devices 7072 may include, but are not limited to, a physical keyboard, a function button (such as a volume control button, a switch button, and the like), a trackball, a mouse, and a joystick, which will not be repeated here.

In the embodiments of the present disclosure, after receiving DL data from a network-side device, the radio frequency unit 701 sends the DL data to the processor 710 for processing. In addition, UL data is sent to the network-side device. Generally, the radio frequency unit 701 includes, but is not limited to, an antenna, at least one amplifier, a transceiver, a coupler, a low noise amplifier, a duplexer, and the like.

The memory 709 is configured to store a software program or an instruction and various data. The memory 709 may mainly include a program/instruction storage area and a data storage area. The program/instruction storage area may store an operating system, an application program or instruction required by at least one function (for example, a sound playback function and an image display function), and the like. In addition, the memory 709 may include a high-speed random access memory, and may also include a non-transitory memory, where the non-transitory memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM) or flash memory, such as at least one magnetic disk storage device, a flash memory, or another nonvolatile solid-state storage device.

The processor 710 may include one or more processing units. Optionally, the processor 710 may integrate an application processor and a modem processor, where the application processor mainly processes an operating system, a user interface, an application program/instruction, and the like, and the modem processor mainly processes wireless communication, such as a baseband processor. It can be understood that, the modem processor may not be integrated into the processor 710.

The processor 710 is configured to determine that a first subband is an available resource or an unavailable resource according to a resource type of the first subband; and perform transmission of a first signal on the basis of the first subband in a case that the first subband is an available resource, where the first signal includes an SRS and/or a CSI-RS.

Optionally, the processor 710 is configured to: determine that the first subband is an available resource in a case that the first signal includes an SRS and the resource type of the first subband is uplink and/or flexible; and/or determine that the first subband is an available resource in a case that the first signal includes a CSI-RS and the resource type of the first subband is downlink and/or flexible.

Optionally, the processor 710 is configured to perform transmission of the first signal based on second subbands in a case that a plurality of first subbands are determined to be available resources, where the second subbands are at least one of the following: consecutive subbands in the plurality of first subbands; and/or subbands with a first specified index value among the plurality of first subbands.

Optionally, the first specified index value includes a maximum index value or a minimum index value among index values of the plurality of first subbands.

Optionally, the resource type of the first subband is indicated through first indication information. The first indication information includes at least one of high-layer signaling, MAC CE, and DCI.

Optionally, the transmission time of the first indication information is earlier than the transmission time of the first signal, and there is a first time difference between the transmission time of the first indication information and the transmission time of the first signal.

Optionally, the processor 710 is further configured to select a target SRS configuration from at least one set of SRS configurations on the basis of the first subband determined to be an available resource in a case that the first signal includes the SRS and is configured with the at least one set of SRS configurations.

Optionally, the target SRS configuration meets at least one of the following: the SRS resources in the target SRS configuration are all located in the first subband determined to be an available resource; in the at least one set of SRS configurations, the target SRS configuration has the largest number of resources occupied by the SRS resources; and the target SRS configuration is an SRS configuration with a second specified index value in the at least one set of the SRS configurations, where the second specified index value includes a maximum index value or a minimum index value.

Optionally, the third subband includes a plurality of consecutive subbands, and the plurality of consecutive subbands do not include subbands determined to be unavailable resources, where the third subband is configured to determine the number of resources occupied by the SRS resources in each set of SRS configurations.

Optionally, the processor 710 is further configured to: determine a target transmission power for the SRS transmission according to a first SRS configuration or the bandwidth of the first SRS configuration in a case that the first signal includes the SRS and is configured with at least one set of SRS configurations, where the first SRS configuration belongs to the at least one set of SRS configurations; and perform transmission of the first signal at the target transmission power on the basis of the first subband.

Optionally, the processor 710 is further configured to: determine that a transmission power corresponding to the first SRS configuration is the target transmission power in a case that the number of resources included in the first subband determined to be an available resource is less than the number of resources occupied by the SRS in the first SRS configuration; or scale the total transmission power corresponding to the first SRS configuration according to a predetermined ratio to obtain the target transmission power in a case that the number of resources included in the first subband determined to be an available resource is less than the number of resources occupied by the SRS in the first SRS configuration, where the predetermined ratio is determined according to the number of resources included in the first subband determined to be an available resource and the number of resources occupied by the SRS in the first SRS configuration.

Optionally, the first SRS configuration includes one of the following: a reference SRS configuration specified by the protocol or indicated by a network; an SRS configuration of which the bandwidth is a specified value; and an SRS configuration of which the index value is a third specified index value, Optionally, the number of resources is any one of the number of subbands, the number of RBs, and the number of REs.

Optionally, the processor 710 is further configured to perform at least one of the following in a case that the CSI-RS is received in a first time unit but some frequency domain resources in the time domain resources in the first time unit are unavailable resources: not reporting a CSI report corresponding to the CSI-RS; reporting a first CSI report determined based on a first CSI-RS, where the first CSI-RS is a CSI-RS received through the first subband that is in the first time unit and determined to be an available resource; reporting a parameter value in the CSI report corresponding to the CSI-RS that goes out of a predetermined range; and reporting a second CSI report, where the second CSI report is a CSI report reported by the terminal previously.

Optionally, the some frequency domain resources include at least one subband and/or a guard band between the subbands.

Optionally, in a case that the CSI report corresponding to the wideband CSI-RS is reported, the CSI report is reported through the first subband determined to be an available resource.

Optionally, the unavailable resource includes at least one of the following: a subband of which the resource type is uplink or flexible; a guard band; and a subband that includes a number of resources less than a predetermined value, where the number of resources is the number of RBs or the number of REs.

Optionally, resource types of the first subbands located in different time units are different.

In this embodiment, the terminal determines whether to perform signal transmission on a subband according to the resource type (such as resource direction) of the subband configured or indicated by a network. In this way, it can solve the problem that transmission of signals such as SRS and/or CSI-RS that is only performed on some frequency resources in a full-duplex network or a flexible duplex network, thereby improving the signal transmission efficiency.

An embodiment of the present disclosure further provides a non-transitory readable storage medium having a program or instruction stored thereon. When executed by a processor, the program or instruction implements various processes of the above-mentioned signal transmission method embodiments, and the same technical effect can be achieved. In order to avoid repetition, it will not be repeated here.

The processor is the processor in the terminal described in the foregoing embodiment. The non-transitory readable storage medium includes a non-transitory computer readable storage medium, such as a computer read-only memory (ROM), a random access memory (RAM), a magnetic disk, an optical disk, or the like.

An embodiment of the present disclosure further provides a chip, including a processor and a communication interface; the communication interface is coupled with the processor; the processor is configured to run a program or an instruction of a network-side device to implement various processes of the above-mentioned signal transmission method embodiments, and the same technical effect can be achieved. In order to avoid repetition, it will not be repeated here.

It is to be understood that the chip mentioned in the embodiment of the present disclosure may also be referred to as system-level chip, system-on-chip, system-on-chip, system-on-chip, or the like.

An embodiment of the present disclosure further provides a computer program product, including a processor, a memory, and a program or an instruction that is stored in the memory and can run on the processor. When executed by the processor, the program or instruction implements various processes of the above-mentioned signal transmission method embodiments, and the same technical effect can be achieved. In order to avoid repetition, it will not be repeated here.

The term "include", "comprise", or any other variation thereof used herein is intended to cover a non-exclusive inclusion, which specifies the presence of stated processes, methods, objects, or apparatuses, but do not preclude the presence or addition of one or more other processes, methods, objects, or apparatuses. Without more limitations, elements defined by the sentence "including a/an . . . " do not exclude that there are still other same elements in the processes, methods, objects, or apparatuses that include the element. In addition, the scope of the method and apparatus in the embodiments of the present disclosure is not limited to performing functions in the order shown or discussed, and may also include performing functions in a substantially simultaneous manner or in a reverse order according to the functions involved. For example, the described method may be performed in an order different from the described order, and various steps may also be added, omitted, or combined. In addition, features described in some examples may also be combined in other examples.

According to the descriptions in the foregoing implementations, a person skilled in the art may clearly learn that the methods according to the foregoing embodiments may be implemented by means of software plus a necessary general-purpose hardware platform, and certainly may also be implemented by means of hardware, but the former is a better implementation in many cases. With this understanding, the technical solutions of the present disclosure, in essence or for the part contributing to the prior art, may be embodied in the form of a computer software product. The computer software product is stored in a non-transitory storage medium (such as, a ROM/RAM, a magnetic disk, or an optical disc) including several instructions to enable a terminal (which may be a mobile phone, a computer, a server, an air conditioner, a network device, or the like) to perform the methods described in various embodiments of the present disclosure.

The embodiments of the present disclosure are described above with reference to the accompanying drawings. The present disclosure is not limited to the embodiments described above, and the embodiments described above are merely exemplary and not limitative. Those of ordinary skill in the art may make various variations under the teaching of the present disclosure without departing from the spirit of the present disclosure and the protection scope of the claims, and such variations shall all fall within the protection scope of the present disclosure.

What is claimed is:

1. A signal transmission method, comprising:

determining, by a terminal, that a first subband is an available resource or an unavailable resource according to a resource type of the first subband; and performing, by the terminal, transmission or reception of a first signal on the basis of the first subband in a case that the first subband is an available resource, wherein the first signal comprises sounding reference signal (SRS) and/or channel state information-reference signal (CSI-RS); wherein before the operation of performing transmission or reception of a first signal on the basis of the first subband in a case that the first signal comprises the SRS and is configured with at least one set of SRS configurations, the method further comprises:

selecting a target SRS configuration from at least one set of SRS configurations on the basis of a first subband determined to be an available resource; and after the operation of performing transmission or reception of a first signal on the basis of the first subband in a case that the first subband comprises the CSI-RS, the method further comprises:

performing the following by the terminal in a case that the CSI-RS is received in a first time unit but some frequency domain resources in time domain resources in the first time unit are unavailable resources;

reporting a first CSI report determined based on a first CSI-RS, wherein the first CSI-RS is a CSI-RS received through a first subband that is in the first time unit and determined to be an available resource.

2. The method according to claim 1, wherein the operation of determining that a first subband is an available resource or an unavailable resource according to a resource type of the first subband comprises at least one of following:

determining that the first subband is an available resource in a case that the first signal comprises the SRS and the resource type of the first subband is uplink and/or flexible; and determining that the first subband is an available resource in a case that the first signal comprises the CSI-RS and the resource type of the first subband is downlink and/or flexible.

3. The method according to claim 1, wherein the operation of performing transmission or reception of a first signal on the basis of the first subband comprises:

performing the transmission or reception of the first signal based on second subbands in a case that a plurality of first subbands are determined to be available resources, wherein the second subbands are at least one of following:

consecutive subbands in the plurality of first subbands; and/or subbands with a first specified index value among the plurality of first subbands.

4. The method according to claim 3, wherein the first specified index value comprises a maximum index value or a minimum index value among index values of the plurality of first subbands.

5. The method according to claim 1, wherein the resource type of the first subband is indicated through first indication information, wherein the first indication information comprises at least one of high-layer signaling, medium access control (MAC)-control element (CE), and downlink control information.

6. The method according to claim 5, wherein transmission time of the first indication information is earlier than transmission time of the first signal, and there is a first time difference between the transmission time of the first indication information and the transmission time of the first signal.

7. The method according to claim 1, wherein the target SRS configuration meets at least one of following that:

SRS resources in the target SRS configuration are all located in the first subband determined to be an available resource;

in the at least one set of SRS configurations, the target SRS configuration has the largest number of resources occupied by the SRS resources; and the target SRS configuration is an SRS configuration with a second specified index value in the at least one set of the SRS configurations.

8. The method according to claim 7, wherein a third subband comprises a plurality of consecutive subbands, and the plurality of consecutive subbands do not comprise subbands determined to be unavailable resources, wherein the third subband is used to determine the number of resources occupied by SRS resources in each set of SRS configurations.

9. The method according to claim 1, wherein before the operation of performing transmission or reception of a first signal on the basis of the first subband, the method further comprises:

determining a target transmission power for SRS transmission according to a first SRS configuration or bandwidth of the first SRS configuration in a case that the first signal comprises the SRS and is configured with at least one set of SRS configurations, wherein the first SRS configuration belongs to the at least one set of SRS configurations; and the operation of performing transmission or reception of a first signal on the basis of the first subband comprises:

performing transmission or reception of the first signal at the target transmission power on the basis of the first subband.

10. The method according to claim 9, wherein the operation of determining a target transmission power according to a first SRS configuration or bandwidth of the first SRS configuration comprises:

determining that a transmission power corresponding to the first SRS configuration is the target transmission power in a case that the number of resources comprised in a first subband determined to be an available resource is less than the number of resources occupied by SRS in the first SRS configuration; or scaling a total transmission power corresponding to the first SRS configuration according to a predetermined ratio to obtain the target transmission power in a case that the number of resources comprised in the first subband determined to be an available resource is less than the number of resources occupied by the SRS in the first SRS configuration, wherein the predetermined ratio is determined according to the number of resources comprised in the first subband determined to be an available resource and the number of resources occupied by the SRS in the first SRS configuration.

11. The method according to claim 9, wherein the first SRS configuration comprises at least one of following:

a reference SRS configuration specified by a protocol or configured by a network;

an SRS configuration of which the bandwidth is a specified value; and an SRS configuration of which an index value is a third specified index value.

12. The method according to claim 7, wherein the number of resources is any one of the number of subbands, the number of resource blocks, and the number of resource elements.

13. The method according to claim 1, wherein after the operation of performing transmission or reception of a first signal on the basis of the first subband in a case that the first subband comprises the CSI-RS, the method further comprises:

performing at least one of following by the terminal in a case that the CSI-RS is received in a first time unit but some frequency domain resources in time domain resources in the first time unit are unavailable resources:

not reporting a CSI report corresponding to the CSI-RS;

reporting a parameter value in the CSI report corresponding to the CSI-RS that goes out of a predetermined range; and reporting a second CSI report, wherein the second CSI report is a CSI report reported by the terminal previously.

14. The method according to claim 13, wherein the some frequency domain resources comprise at least one subband and/or a guard band between subbands; or in a case that the CSI report corresponding to the wideband CSI-RS is reported, the CSI report is reported through a first subband determined to be an available resource; or the unavailable resource comprises at least one of following:

a subband of which a resource type is uplink or flexible;

a guard band; and a subband that comprises a number of resources less than a predetermined value.

15. The method according to claim 1, wherein resource types of the first subbands located in different time units are different.

16. A terminal, comprising a processor, a memory, and a program or an instruction stored in the memory and executable on the processor, where the program or the instruction, when executed by the processor, causes the terminal to perform:

determining that a first subband is an available resource or an unavailable resource according to a resource type of the first subband; and performing transmission or reception of a first signal on the basis of the first subband in a case that the first subband is an available resource, wherein the first signal comprises sounding reference signal (SRS) and/or channel state information-reference signal (CSI-RS); wherein in a case that the first signal comprises the SRS and is configured with at least one set of SRS configurations, causes the terminal further to perform:

selecting a target SRS configuration from at least one set of SRS configurations on the basis of a first subband determined to be an available resource; and in a case that the first subband comprises the CSI-RS, causes the terminal further to perform:

reporting a first CSI report determined based on a first CSI-RS in a case that the CSI-RS is received in a first time unit but some frequency domain resources in time domain resources in the first time unit are unavailable resources, wherein the first CSI-RS is a CSI-RS received through a first subband that is in the first time unit and determined to be an available resource.

17. The terminal according to claim 16, wherein the program or the instruction, when executed by the processor, causes the terminal to perform at least one of following:

determining that the first subband is an available resource in a case that the first signal comprises the SRS and the resource type of the first subband is uplink and/or flexible; and determining that the first subband is an available resource in a case that the first signal comprises the CSI-RS and the resource type of the first subband is downlink and/or flexible; or the program or the instruction, when executed by the processor, causes the terminal to perform:

performing the transmission or reception of the first signal based on second subbands in a case that a plurality of first subbands are determined to be available resources, wherein the second subbands are at least one of following:

consecutive subbands in the plurality of first subbands; and/or subbands with a first specified index value among the plurality of first subbands.

18. A non-transitory computer-readable storage medium, storing a program or an instruction, wherein the program or the instruction, when executed by a processor of a terminal, causes the terminal to perform:

determining that a first subband is an available resource or an unavailable resource according to a resource type of the first subband; and performing transmission or reception of a first signal on the basis of the first subband in a case that the first subband is an available resource, wherein the first signal comprises sounding reference signal (SRS) and/or channel state information-reference signal (CSI-RS); wherein in a case that the first signal comprises the SRS and is configured with at least one set of SRS configurations, causes the terminal further to perform:

selecting a target SRS configuration from at least one set of SRS configurations on the basis of a first subband determined to be an available resource; and in a case that the first subband comprises the CSI-RS, causes the terminal further to perform:

reporting a first CSI report determined based on a first CSI-RS in a case that the CSI-RS is received in a first time unit but some frequency domain resources in time domain resources in the first time unit are unavailable resources, wherein the first CSI-RS is a CSI-RS received through a first subband that is in the first time unit and determined to be an available resource.

19. The non-transitory computer-readable storage medium according to claim 18, wherein the program or the instruction, when executed by the processor, causes the terminal to perform at least one of following:

determining that the first subband is an available resource in a case that the first signal comprises the SRS and the resource type of the first subband is uplink and/or flexible; and determining that the first subband is an available resource in a case that the first signal comprises the CSI-RS and the resource type of the first subband is downlink and/or flexible; or the program or the instruction, when executed by the processor, causes the terminal to perform:

performing the transmission or reception of the first signal based on second subbands in a case that a plurality of first subbands are determined to be available resources, wherein the second subbands are at least one of following:

consecutive subbands in the plurality of first subbands; and/or subbands with a first specified index value among the plurality of first subbands.

* * * * *